Patented July 28, 1936

2,048,774

UNITED STATES PATENT OFFICE 2,048,774

SYNTHETIC RESINS

Elmer K. Bolton, Wilmington, Del., assignor to E. I. du Pont de Nemours & Company, Wilmington, Del., a corporation of Delaware No Drawing. Application April 17, 1934, Serial No. 721,067

2 Claims. (Cl. 260—8)

This invention relates to resinous materials and more particularly to improved resins of the polyhydric alcohol-polybasic acid type.

This invention has as an object the production of new and useful resins. Another object is the manufacture of polyhydric alcohol-polybasic acid resins which in addition to being fusible and soluble, have certain other valuable and unique properties. A further object is a method for preparing improved resins of the polyhydric alcohol-polybasic acid type. Other objects will appear hereinafter.

The objects of the invention, in its preferred embodiment, are accomplished by heating together an alicyclic secondary dihydric alcohol and a polycarboxylic acid for a sufficient time to give the desired degree of condensation. The various additional agents such as fatty oils, oil acids, etc. known to the art to be useful in resins of the polyhydric alcohol-polybasic acid type may be included in the reaction mixture. Any of the methods well known to the art may be employed in the preparation of these resins. Likewise, variations in the order of reacting the ingredients may be made without departing from the scope or spirit of this invention. I generally prefer to use a "balanced" formula, i. e., chemically equivalent proportions of the ingredients.

By the term "alicyclic secondary dihydric alcohol" I mean the products obtainable by hydrogenation of mono-nuclear or poly-nuclear dihydric phenols, the phenolic hydroxyl groups in the case of poly-nuclear phenols being contained in the same or different cyclic nuclei. In its broadest sense, the above quoted expression implies an alicyclic compound having two hydroxyl groups attached to nuclear —CH— groups.

The following examples are illustrative of the method of carrying out my invention:

Example I

| | Parts |
|---|---|
| 1,4-dihydroxycyclohexane | 43.10 |
| Phthalic anhydride | 56.90 |
| Total | 100.00 |

The ingredients are mixed, heated in two hours to 200–210° C., and held at that temperature for about ten hours. The resinous product obtained has an acid number of 68.2, and is soluble in aromatic hydrocarbon solvents.

Example II

| | Parts |
|---|---|
| 1,3-dihydroxycyclohexane | 43.08 |
| Phthalic anhydride | 56.92 |
| Total | 100.00 |

The ingredients are mixed, heated in fifty minutes to 200° C., and held at that temperature for about ten hours. The resinous product obtained has an acid number of 65.4, and is soluble in aromatic hydrocarbon and ester solvents. Solutions of this resin are compatible with cellulose nitrate.

Example III

| | Parts |
|---|---|
| Di(4-hydroxycyclohexyl)-dimethylmethane | 61.86 |
| Phthalic anhydride | 38.14 |
| Total | 100.00 |

The ingredients are mixed, heated up to 210° C. in forty-five minutes, held at that temperature for two hours, then heated up to 220° C., and held at that temperature for two hours longer. A hard, brittle resin of acid number 54.5 is obtained. The product is soluble initially in aromatic hydrocarbon and ester solvents, and is compatible with nitrocellulose.

Example IV

| | Parts |
|---|---|
| 1,4-dihydroxycyclohexane | 14.91 |
| Linseed oil | 51.41 |
| Phthalic anhydride | 14.27 |
| Rosin | 19.41 |
| Total | 100.00 |

The alcohol, anhydride, and rosin are melted together and heated to about 200° C. The oil is added in small portions with stirring and the temperature held at 200–225° C. for 10–15 hours, or until an acid number of 20–30 is reached. A soft balsamic resin is obtained which may be thinned with aromatic-aliphatic hydrocarbon mixtures to form valuable air drying varnishes. Cobalt drier is recommended. This resin solution, when pigmented and drier added, forms valuable light-stable paints. In preparing the resin, an alternative method is to heat the 1,4-dihydroxycyclohexane and oil in the presence of an alcoholysis catalyst, e. g. litharge, for 1–2 hours at 200° C.; the remaining ingredients are then added and the mixture heated to resinification.

Other alicyclic secondary dihydric alcohols may replace those mentioned above. Examples of these alcohols are 4,4'-dihydroxy dicyclohexane; di(4-hydroxy-3-methylcyclohexyl)-dimethylmethane; di(4-hydroxy-3-chlorocyclohexyl) dimethylmethane; di(4-hydroxycyclohexyl) cyclohexane; di(4-hydroxycyclohexyl)-cyclohexylmethane; dioxynaphthanes; di(4-hydroxynaphthanyl)-dimethylmethane; etc.

Resins useful generally in the arts, as for coating, impregnation, etc., may also be made from the alicyclic secondary polyhydric alcohols having more than two hydroxyl groups such as quebrachitol, inositol, cyclohexane 1-3-5-triol, pinitol, cocositol, inositol monomethyl ether (bornesitol), inositol dimethyl ether (dambonitol), scyllitol, and the like. The dihydric alcohols, however, have an important advantage not possessed by the trihydric and higher alcohols in that the dihydric alcohols of the kind described above act as holding agents to prevent gelling of the resins and yet do not exert a softening action on the resin as do the dihydric alcohols previously used in the manufacture of polyhydric alcohol-polybasic acid resins.

The properties of the resins may be influenced by conducting the resin reaction in the presence of various modifying agents such as linseed oil acids, China wood oil, and rosin. Suitable modifying ingredients include other drying oils and the acids derived therefrom; semi-drying and non-drying oils and the acids derived therefrom; treated oils such as oxidized and hydrogenated oils and the acids derived therefrom; natural resins and natural resin acids, etc. Monobasic aliphatic and aromatic acids, such as stearic, oleic, linoleic, benzoic, benzoyl benzoic, etc. are other useful modifying agents. When fatty oils are used these should be heat treated with the polyhydric alcohol and the resulting mono- and diglycerides reacted with the polycarboxylic acid.

The alicyclic polyhydric secondary alcohols may be substituted in part by other polyhydric alcohols or by monohydric alcohols. Examples of suitable polyhydric alcohols include glycerol and polyglycerols; ethylene glycol, heximethylene glycol, decamethylene glycol, etc.; polyglycols, e. g., diethylene glycol, etc.; pentaerythritol, mannitol, etc. Suitable monohydric alcohols include ethyl alcohol, amyl alcohol, benzyl alcohol, borneol, terpineol, heptyl alcohol, dodecyl alcohol, octadecyl alcohol, and the like.

Suitable polybasic acids in addition to phthalic include substituted phthalic acids, succinic, adipic, fumaric, malic, maleic, mellitic, pyromellitic, keto-succinic, amino-succinic, salicyl-acetic, thio-diglycollic acids, etc.

The resins of this invention can be combined with oils and certain cellulose derivatives, and these find useful application in the manufacture of coating and impregnating compositions. The resins synthesized and disclosed herein can be blended by heating, by mutual solvents, or by other means with one or more of the following substances: drying, semi-drying, and non-drying oils and the acids derived therefrom; cellulose derivatives, e. g., nitrocellulose, ethyl cellulose, benzyl cellulose, cellulose acetate, etc.; natural resins and ester gums, e. g., rosin, copal, congo, kauri, and rosin ester; other synthetic resins and resin-forming materials, e. g., coumaronindene resins, vinyl resins, casein, acrylic ester polymers, etc.; bitumens, e. g., natural and processed asphalts; natural and synthetic waxes, e. g., Montan wax, beeswax, candelilla wax, dodecyl stearate, etc.; and other ester-like bodies, e. g., stearin, dibutyl phthalate, tricresyl phosphate, hydrogenated castor oil, etc. To the products combined with oils and/or one or more of the above enumerated materials may be added pigments, fillers, lakes, solvents, plasticizers, etc., as needed and desired in accordance with methods known to the art.

In addition to the particular use as coating compositions, any of the above enumerated combinations may be used as impregnating and coating agents for cellulosic materials, e. g., paper, cloth, wood, etc., for bibulous materials, e. g., stone, plaster, etc., for rubberized flexible fabric sheetings, etc., as sandwiching material or adhesive therefor in the manufacture of shatterproof glass; as adhesives, cements, and sealing waxes for general use; as binding agents for mica, asbestos, and the like in the manufacture of insulating materials; as a binder for cotton flock in the manufacture of artificial suede, etc.

As previously indicated, the alicyclic secondary dihydric alcohols are particularly valuable in the manufacture of my new resins because they act as holding agents in the resin reaction and thereby prevent gelling. In this respect these alicyclic alcohols behave similar to ordinary aliphatic dihydric alcohols, but unlike the aliphatic dihydric alcohols the alicyclic secondary dihydric alcohols used in the present invention are unique in that they exert this holding action without concomitantly exerting a softening action on the resin. Valuable hard resins of low acid number can therefore be prepared without danger of gellation. Also the unmodified resins prepared from alicyclic secondary dihydric alcohols are compatible with nitrocellulose, and are soluble in aromatic hydrocarbon solvents, whereas ordinary ethylene glycol-phthalic anhydride resin is insoluble in hydrocarbon solvents and incompatible with nitrocellulose.

As many apparently widely different embodiments of this invention may be made without departing from the spirit and scope thereof, it is to be understood that I do not limit myself to the specific embodiments thereof except as defined in the appended claims.

I claim:

1. The resinous reaction product of resin-forming ingredients consisting essentially of a polycarboxylic acid and an alicyclic secondary dihydric alcohol which is the product obtained by hydrogenation of a dihydric phenol.

2. The resinous reaction product of an alicyclic secondary polyhydric alcohol and a polycarboxylic acid, said resinous reaction product being one in which the polyhydric alcohol is selected from the class consisting of 1,4-dihydroxycyclohexane, di(4-hydroxycyclohexyl) dimethylmethane, and di(4-hydroxycyclohexyl) cyclohexane.

ELMER K. BOLTON.